(12) United States Patent
Bruno et al.

(10) Patent No.: US 7,013,651 B2
(45) Date of Patent: Mar. 21, 2006

(54) COMPACT QUICK ATTACH STARTER-GENERATOR INSTALLATION

(75) Inventors: Vittorio Bruno, Mississauga (CA); Bryan Olver, Nobleton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 11/024,496

(22) Filed: Dec. 30, 2004

(65) Prior Publication Data

US 2006/0026967 A1   Feb. 9, 2006

Related U.S. Application Data

(62) Division of application No. 10/321,572, filed on Dec. 18, 2002, now Pat. No. 6,851,267.

(51) Int. Cl.
*F02C 7/18* (2006.01)
*F02C 7/268* (2006.01)

(52) U.S. Cl. .......................... 60/788; 60/801; 60/802; 60/39.83

(58) Field of Classification Search ............. 60/39.83, 60/796–798, 786–788, 790; 310/52, 58, 310/59
See application file for complete search history.

(56) References Cited

U.S. PATENT DOCUMENTS

| | | | | |
|---|---|---|---|---|
| 2,414,532 A | * | 1/1947 | Johns et al. | 310/57 |
| 2,522,675 A | * | 9/1950 | Hoover | 310/62 |
| 2,908,189 A | * | 10/1959 | Parker et al. | 60/788 |
| 3,073,976 A | * | 1/1963 | Wesolowski | 310/59 |
| 3,623,546 A | * | 11/1971 | Banthin et al. | 60/39.83 |
| 3,859,785 A | * | 1/1975 | Leto et al. | 60/39.83 |
| 4,766,337 A | * | 8/1988 | Parkinson et al. | 310/58 |
| 6,152,978 A | * | 11/2000 | Lundquist | 55/385.1 |

\* cited by examiner

*Primary Examiner*—Ted Kim
(74) *Attorney, Agent, or Firm*—Ogilvy Renault LLP

(57) ABSTRACT

A mounting system for mounting an air-cooled device to a mount, the device having a mounting flange and a cooling air outlet radially inward of an outer periphery of the device, the mounting flange adapted to cooperate with the mount, where the mounting system has a cooling air exhaust collection shroud adapted to surround the device and at least a portion of the mount, the shroud having a discharge outlet.

8 Claims, 4 Drawing Sheets

COMPACT QUICK ATTACH STARTER-GENERATOR INSTALLATION

RELATED APPLICATION

This is a Divisional application of U.S. application Ser. No. 10/321,572 filed Dec. 18, 2002, now U.S. Pat. No. 6,851,267.

TECHNICAL FIELD

The invention relates to a compact quick attach starter-generator mounting system including a cooling air exhaust collecting shroud enveloping connecting flanges releasably secured with a compact V-band clamp.

BACKGROUND OF THE ART

Starter-generators are mounted to gas turbine engines via an auxiliary or accessory gear box housing. The accessory gear box is generally driven by a tower shaft meshing with gears on the low pressure shaft of the engine and providing gear reduced power take off for various accessories such as oil pumps, fuel pumps and the starter-generator on an exterior portion of the engine.

During manufacture, testing and routine maintenance, the starter-generator is often removed and reinstalled. The starter-generator conventionally is an electro magnetic machine with a drive shaft extending out the end mounted to the accessory gear box with a splined shaft surface to engage the gear drive mechanism of the accessory gear box. The starter-generator also includes air cooling with an air inlet usually at an end opposite to the mounted end of the starter-generator such that cooling air passes through to remove excess heat. Air is exhausted with fans out of the opposite mounting end adjacent to the connection of the starter-generator to the accessory housing.

Substantial heat is produced by the starter-generator which must be dissipated by the unit's cooling air flow. The cooling air flow, in a conventional V-band held starter-generator installation, is discharged overboard through a separately located scroll air duct. Conventional installations additionally mount a scroll or collector either axially in line with the starter-generator or radially outward from the starter-generator.

Also, conventionally, the starter-generator is mounted to the accessory gear box with mating flanges that are secured with a V-band clamp that encircles the flanges and provides a quick release and detachment method. The starter-generator has a connecting flange which mates with the connecting flange of the accessory gear box usually having a beveled flange rear face and planar forward face to abut the planar face of the mating flange. The V-band groove engages the beveled rear surfaces of both abutting flanges and when tightened with a clamp mechanism, a wedging action on the interlocking beveled or sloped faces occurs to ensure a tight connection and a liquid impervious seal.

It is an object of the invention to improve upon conventional starter-generator (S/G) mounting systems to include quick release and quick install means for collecting and exhausting the S/G cooling air that is emitted from the starter-generator.

It is a further object of the invention to provide a means to collect exhausted cooling air while maintaining the starter-generator mounting system as a compact and quickly operated system due to the numerous maintenance activities that require removal and installation.

Further objects of the invention will be apparent from review of the disclosure, drawings and description of the invention below.

DISCLOSURE OF THE INVENTION

The invention provides a mounting system, for installing a starter-generator to an accessory housing, where the starter-generator has a mounting end with a connecting flange and a cooling air outlet radially inward of a peripheral starter-generator housing edge, and where the accessory housing has a matching connecting flange radially inward of a peripheral accessory housing edge. The mounting system includes a cooling air outlet collection shroud enveloping the peripheral starter-generator housing edge and the peripheral accessory housing edge, the shroud having a discharge outlet. A V-band clamp releasably secures the connecting flanges together and is enveloped within the shroud in a compact mounting system that collects and discharges the exhausted cooling air.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
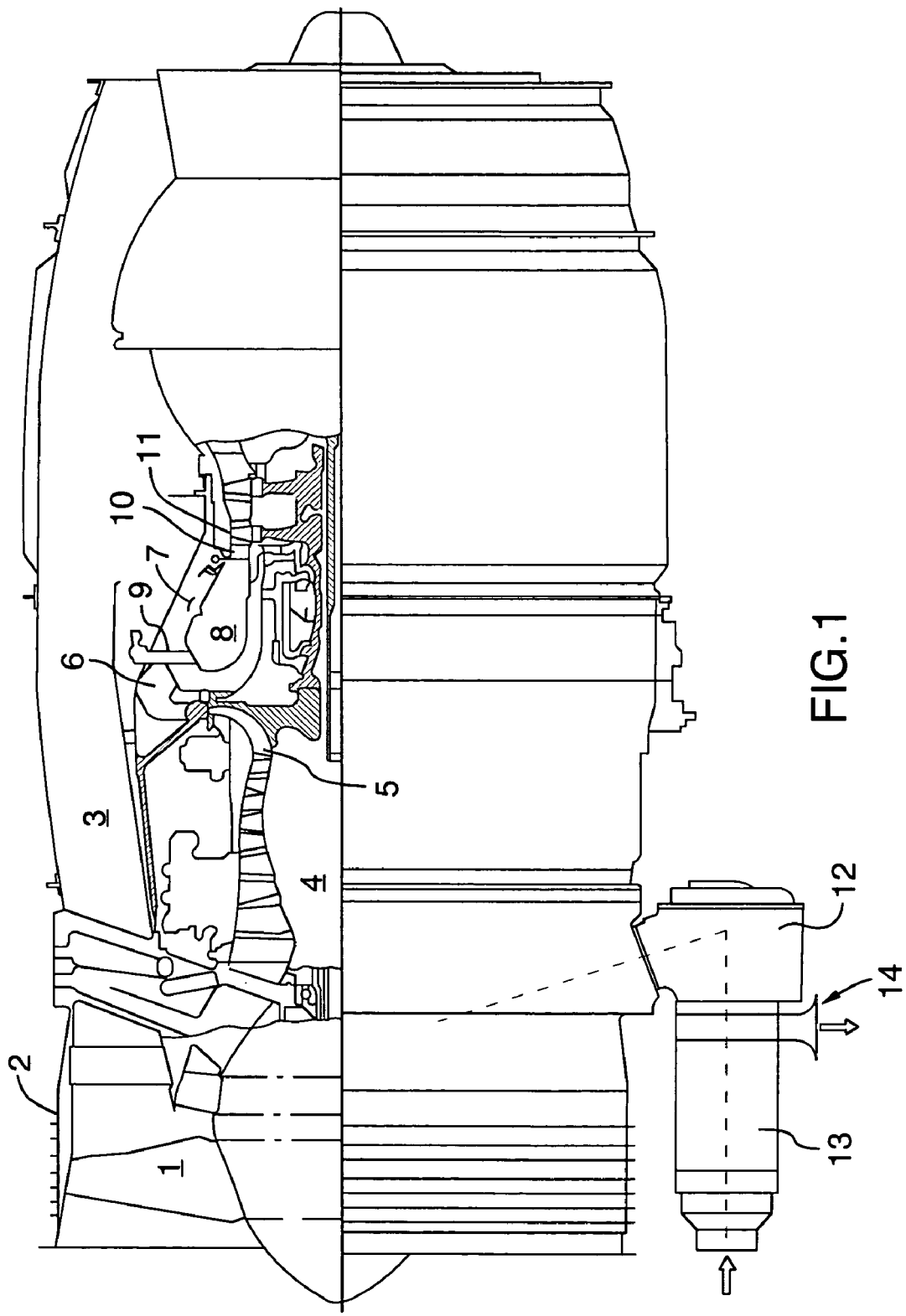
FIG. 1 is an axial cross-sectional view through a typical turbofan engine showing the general arrangement of conventional components including the accessory gear box located at the bottom left and the starter-generator mounted thereto with cooling air flow shown with arrows.

FIG. 1 shows an axial cross-section through a turbofan gas turbine engine. It will be understood however that the invention is applicable to any type of engine with a starter-generator such as a turboshaft, a turboprop, or auxiliary power unit. Application to other equipment is also possible. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

FIG. 1 also shows at the bottom left corner the mounting of the accessory housing 12 and the starter-generator 13 with a cooling air exhaust collection shroud 14 according to the invention which will be described in detail below. In general, the starter-generator 13 provides: (a) startup power to the engine (to rotate the compressor until combustion is self-sustaining); and (b) electrical power generation by taking mechanical rotational power from the operating engine to power aircraft electrical systems and recharge batteries.

Figure 2:
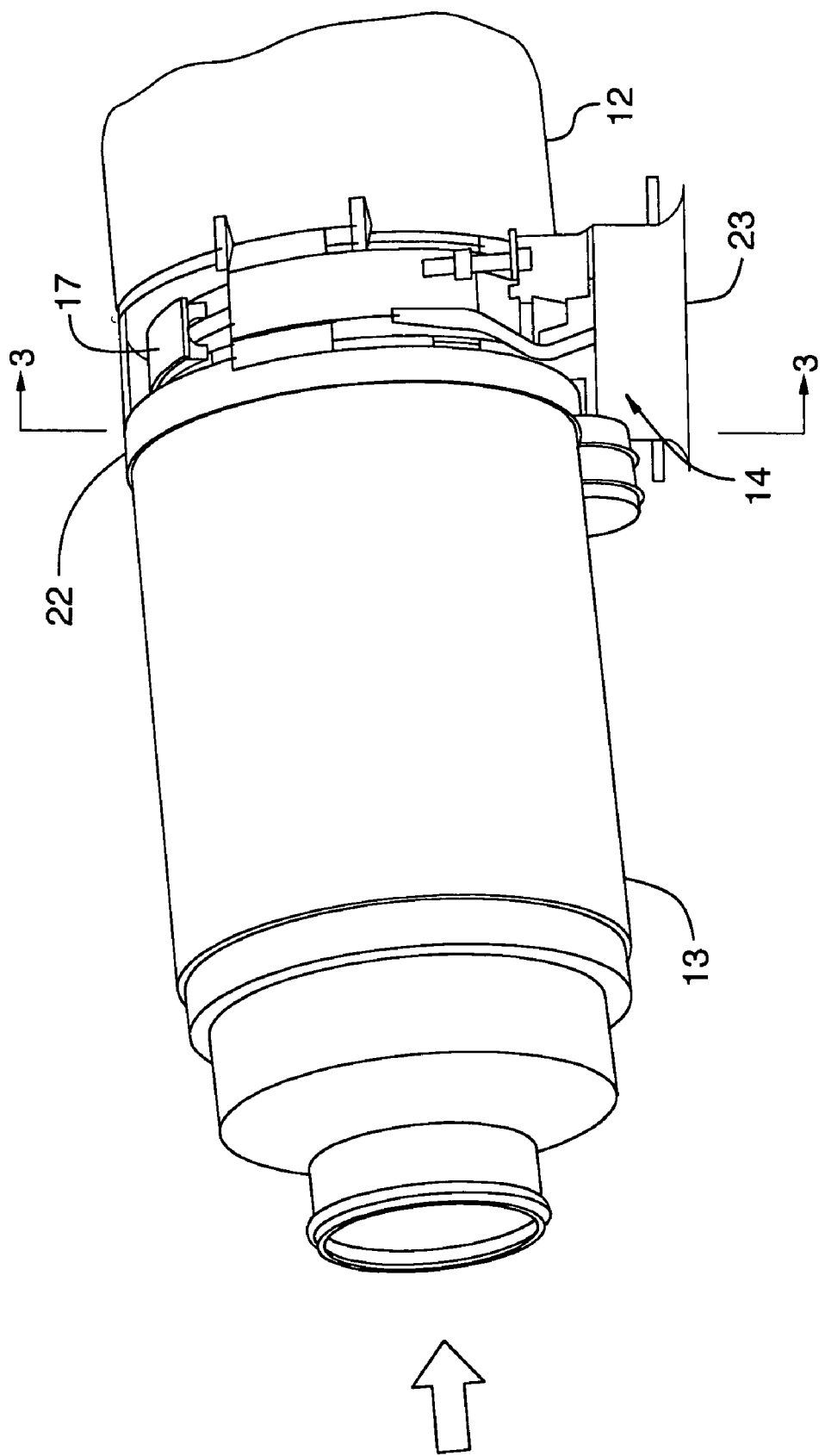
FIG. 2 is perspective detail view of the starter-generator mounted to an accessory gear box with partially transparent and cut away cooling air outlet collection shroud and underlying the V-band clamp joining abutting connecting flanges of the starter-generator and accessory gear box housing.
Figure 3:
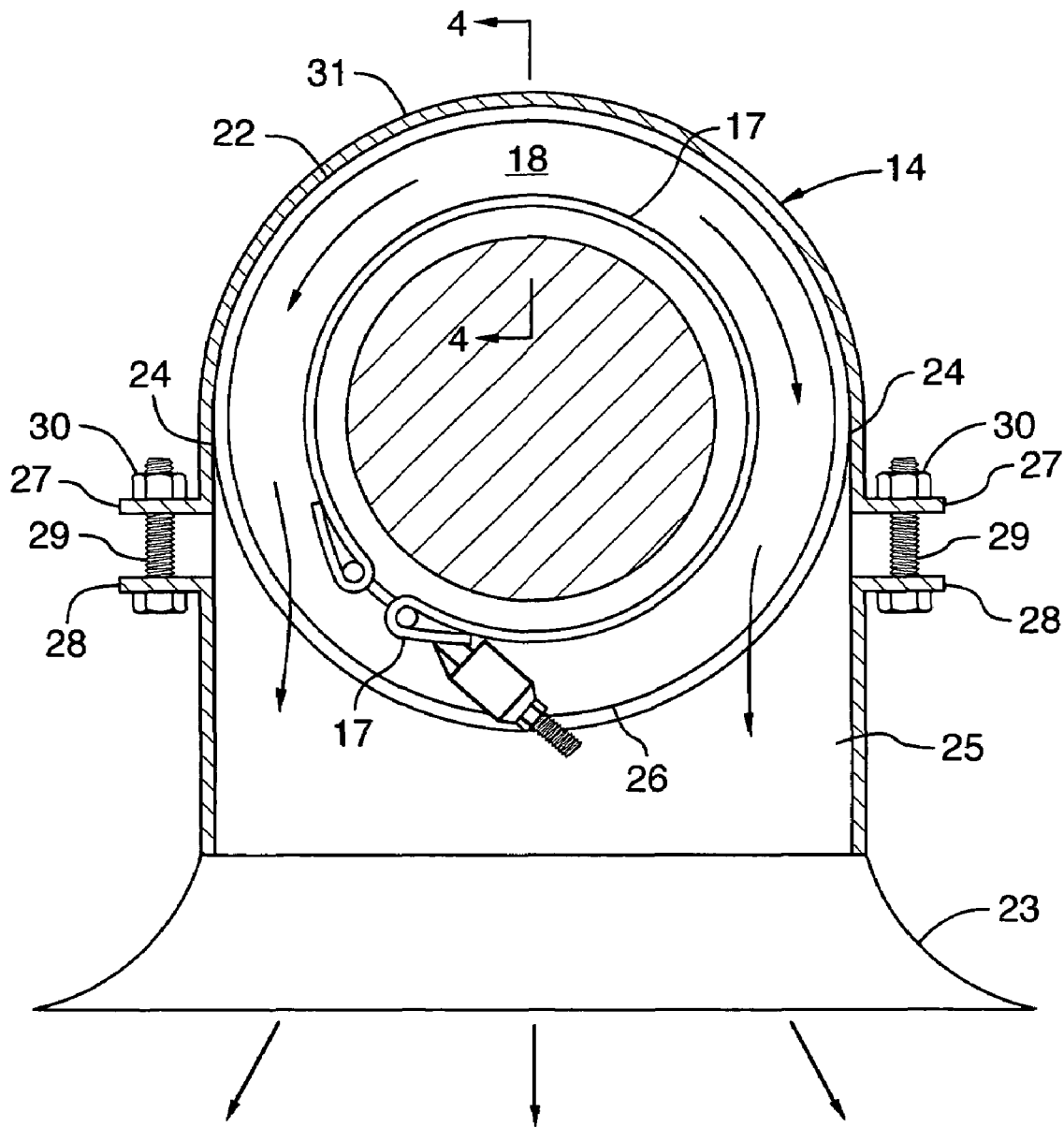
FIG. 3 is a sectional view along lines 3—3 of FIG. 2 showing the V-band clamp attached to the connecting flanges with a surrounding annular air exhaust connection shroud with flared discharge outlet towards the bottom of the outlet.
Figure 4:
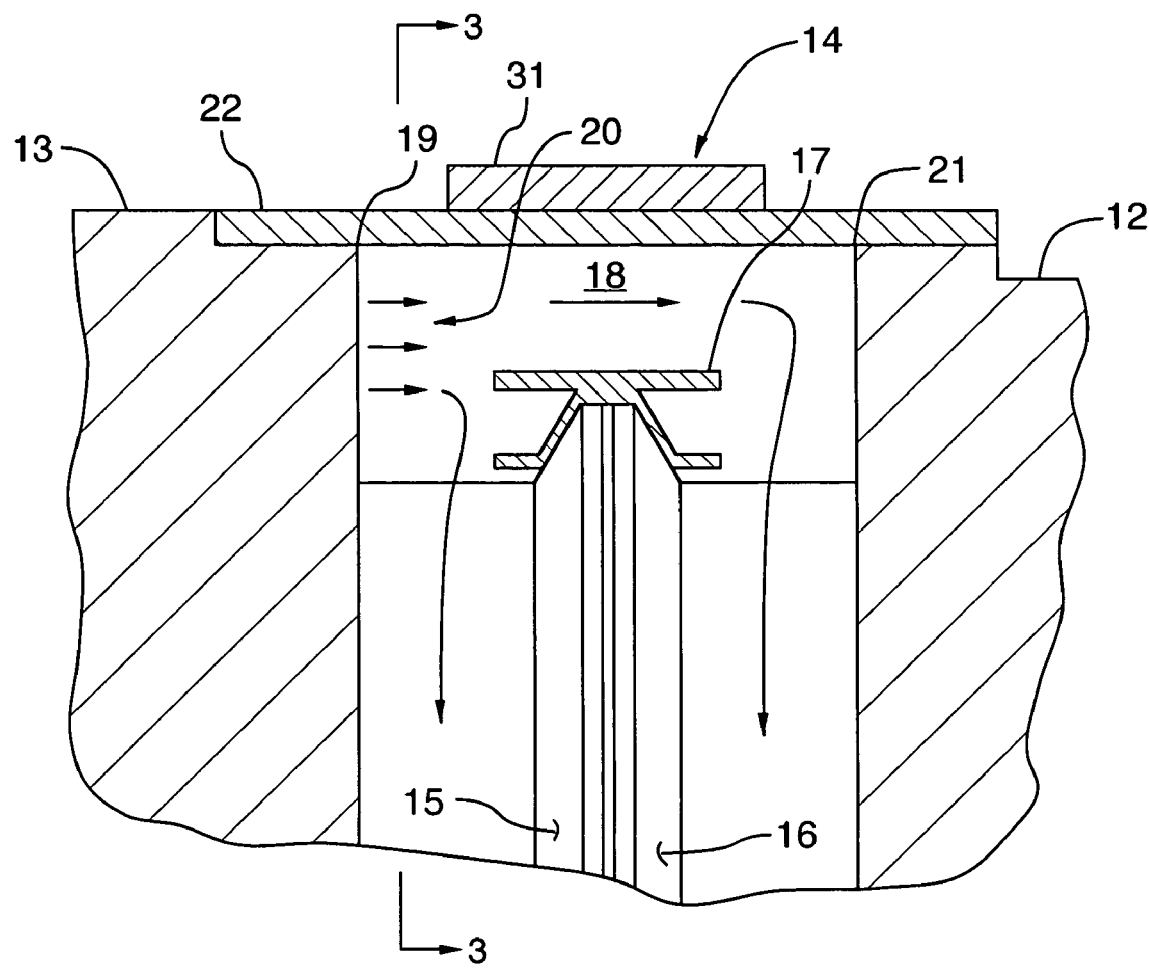
FIG. 4 is a detailed sectional view along lines 4—4 of FIG. 3.

As shown in the detailed views of FIGS. 2, 3 and 4, the starter-generator 13 is attached to the accessory housing 12 with a mounting end that includes a starter-generator connecting flange 15 and the accessory housing 12 includes a matching accessory housing connecting flange 16. A compact V-band clamp 17 releasably secures the connecting flanges 16 and 17 together. Of particular advantage, the V-band clamp 17 is of external diameter smaller than the internal diameter of the shroud 14. As a result, the shroud 14 creates a cooling air collecting plenum 18 which completely surrounds the V-band clamp 17 and connecting flanges 15 and 16.

As best seen in FIG. 4, the starter-generator 13 has a peripheral starter-generator housing edge 19 and the cooling air outlet 20 is radially inward of the starter-generator housing edge 19 enabling the shroud 14 to collect and contain the air passing from the starter-generator 13 through the cooling air outlet 20.

The accessory housing 12 also includes a peripheral accessory housing edge 21 that is radially outward of the accessory housing connecting flange 16. A relatively wide semicircular band 22 of the shroud 14 rests on cylindrical surfaces adjacent to the edges 19 and 21 and provides sufficiently tight seal to contain the cooling air exhaust which is directed to the discharge outlet 23 of the shroud 14 as indicated with arrows in the drawings. In the embodiment illustrated the shroud discharge outlet 14 is rectangular and flares outwardly downstream. Of course, depending on the specific configuration of the engine nacelle and starter-generator/accessory housing configuration, any subsequent ducting of exhaust air will be well within the scope of those familiar with this art.

As best seen in FIG. 3, in order to quickly attach and reinstall the shroud 14, the shroud 14 is split along a joint 24 into a top semi-circular band 22 and a bottom portion 25 that includes a semi-circular cradle opening 26. The bottom portion 25 therefore is shaped as a hollow rectangular box with the semi-circular cradle opening 26 on the upper end to seal around the bottom portions of the edges 19 and 21. The top semi-circular band 22 and bottom portion 25 are joined along the joints 24 with abutting brackets 27 and 28 joined together with a simple bolt 29 and nut 30. In the embodiment illustrated, the upper brackets 27 are formed together with a relatively narrow outer band 31 which results in a simplified construction and further reinforces the relatively wide semicircular 22.

Therefore, assembly of the starter-generator 13 onto the accessory housing 12 takes place by first offering the starter-generator up to the accessory gear box housing 12 and attaching the V-band clamp 17 to secure the abutting surfaces of the connecting flanges 15 and 16 together. Once secured, the two-piece cooling air exhaust collection shroud 14 is fitted upon the matching edges 19 and 21 of the starter-generator 13 and accessory housing 12. Bolts 29 are secured within brackets 27 and 28 and clamped to provide an adequate air seal by tightening nuts 30. Quick release couplings or other clamping mechanisms of course can be provided without departing from the scope of the invention.

Although the above description relates to a specific preferred embodiment as presently contemplated by the inventors, it will be understood that the invention in its broad aspect includes mechanical and functional equivalents of the elements described herein. It will be understood that certain terms used herein, such as "motor", "starter", "generator" etc and contextual and thus may refer generically to a device having a general configuration falling into one or more of these categories.

We claim:

1. A gas turbine engine comprising:
   an air-cooled device having: an outer periphery; a mounting flange; and a cooling air outlet, wherein the mounting flange and the cooling air outlet are disposed adjacent one another and wherein the mounting flange and a cooling air outlet are radially inward of the outer periphery of the air-cooled device, the mounting flange being spaced a distance from a remainder of the air-cooled device;
   a mount on the engine, the mount adapted to connect with the mounting flange radially inward of the outer periphery of the air-cooled device, wherein a peripheral recess is defined relative to the outer periphery of the device when the mount and mounting flange are connected;
   a securing assembly adapted to connect the mounting flange to the mount;
   a cooling air exhaust collection shroud adapted to surround and substantially cover the peripheral recess, the shroud having an air discharge outlet communicating with the cooling air outlet of the air-cooled device, the shroud having a periphery generally aligned with the outer periphery of the air-cooled device.

2. A gas turbine engine according to claim 1, wherein the device is a starter-generator.

3. A gas turbine engine according to claim 1, wherein the securing assembly comprises a quick-release clamp.

4. A gas turbine engine according to claim 1, wherein the air discharge outlet is oriented radially relative to the outer periphery of the device.

5. A gas turbine engine according to claim 1, wherein the shroud surrounding the peripheral recess defines an air collecting plenum in communication with the cooling air outlet of the air-cooled device and in communication with the air discharge outlet.

6. A gas turbine engine according to claim 1, wherein the mounting flange and mount are housed within the air collecting plenum.

7. A gas turbine engine according to claim 1, wherein the shroud surrounds at least a portion of the device.

8. A gas turbine engine according to claim 1, wherein the air discharge outlet is longitudinally aligned with the mounting flange and the mount when connected.

* * * * *